United States Patent
Bae et al.

(10) Patent No.: US 12,337,494 B2
(45) Date of Patent: Jun. 24, 2025

(54) METHOD AND APPARATUS FOR MANUFACTURING UNIT CELLS

(71) Applicant: LG ENERGY SOLUTION, LTD., Seoul (KR)

(72) Inventors: Won-Sik Bae, Daejeon (KR); Dong-Wook Sung, Daejeon (KR); So-Jung Park, Daejeon (KR); Jong-Yoon Lee, Daejeon (KR); So-Mi Jeong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/036,774

(22) PCT Filed: Aug. 22, 2022

(86) PCT No.: PCT/KR2022/012528
§ 371 (c)(1),
(2) Date: May 12, 2023

(87) PCT Pub. No.: WO2023/027456
PCT Pub. Date: Mar. 2, 2023

(65) Prior Publication Data
US 2023/0405858 A1     Dec. 21, 2023

(30) Foreign Application Priority Data
Aug. 23, 2021    (KR) .................. 10-2021-0111257

(51) Int. Cl.
*B26D 1/04*    (2006.01)
*H01M 10/04*    (2006.01)

(52) U.S. Cl.
CPC ........ *B26D 1/045* (2013.01); *H01M 10/0431* (2013.01)

(58) Field of Classification Search
CPC .... B26D 1/046; B26D 1/065; H01M 10/0431
See application file for complete search history.

(56) References Cited

U.S. PATENT DOCUMENTS

| | | | | |
|---|---|---|---|---|
| 4,664,993 A | * | 5/1987 | Sturgis | H01M 6/48 429/162 |
| 4,756,717 A | * | 7/1988 | Sturgis | H01M 6/48 429/162 |

(Continued)

FOREIGN PATENT DOCUMENTS

| | | |
|---|---|---|
| DE | 102017216193 A1 | 3/2019 |
| JP | S59-111275 A | 6/1984 |

(Continued)

OTHER PUBLICATIONS

Office Action issued in corresponding Japanese Patent Application No. 2023-526643, dated Jun. 3, 2024.

(Continued)

*Primary Examiner* — Sean M Michalski
(74) *Attorney, Agent, or Firm* — Morgan, Lewis & Bockius LLP

(57) ABSTRACT

A method for manufacturing unit cells includes preparing a pre-cell having a first separator sheet and a plurality of first electrodes disposed on the first separator sheet while being spaced apart from one another; forming a cutting guide line having a plurality of though-holes spaced apart from one another on the pre-cell; and cutting the pre-cell along the cutting guide line to form a plurality of unit cells. An apparatus for manufacturing unit cells includes a hole-forming unit configured to form a cutting guide line on a pre-cell having a separator sheet and electrodes disposed on the separator sheet where the cutting guide line has a plurality of though-holes spaced apart from one another; and (Continued)

a cutting unit configured to cut the pre-cell along the cutting guide line to form a plurality of unit cells.

14 Claims, 4 Drawing Sheets

(56) References Cited

U.S. PATENT DOCUMENTS

| | | | | |
|---|---|---|---|---|
| 6,477,930 | B1* | 11/2002 | Sandford | B26D 7/1818 |
| | | | | 83/440.1 |
| 2002/0129905 | A1 | 9/2002 | Miller et al. | |
| 2003/0107085 | A1* | 6/2003 | Gudesen | H10D 86/201 |
| | | | | 257/E27.071 |
| 2009/0047350 | A1* | 2/2009 | Bangalore | A61K 9/0056 |
| | | | | 514/252.16 |
| 2013/0000458 | A1* | 1/2013 | Ueda | B26F 1/44 |
| | | | | 83/451 |
| 2014/0309365 | A1* | 10/2014 | Beck | C04B 35/6269 |
| | | | | 428/377 |
| 2014/0366702 | A1* | 12/2014 | Kien | B26D 3/085 |
| | | | | 83/886 |
| 2015/0033547 | A1* | 2/2015 | Yang | H01M 10/058 |
| | | | | 29/623.5 |
| 2021/0273306 | A1* | 9/2021 | Howard | H01M 50/581 |
| 2022/0200038 | A1* | 6/2022 | Bae | H01M 10/0404 |
| 2023/0033345 | A1 | 2/2023 | Maruyama | |
| 2023/0343984 | A1* | 10/2023 | Bae | H01M 10/0413 |
| 2023/0405858 | A1* | 12/2023 | Bae | B26D 9/00 |
| 2024/0391124 | A1* | 11/2024 | Wen | H01M 4/04 |
| 2024/0425374 | A1* | 12/2024 | Caffio | C01B 32/05 |
| 2025/0108469 | A1* | 4/2025 | Andres | B24B 7/12 |

FOREIGN PATENT DOCUMENTS

| | | |
|---|---|---|
| JP | 2002-337241 A | 11/2002 |
| JP | 2005-190709 A | 7/2005 |
| JP | 2011-086506 A | 4/2011 |
| JP | 2015-130297 A | 7/2015 |
| JP | 2015-170568 A | 9/2015 |
| JP | 2016-162546 A | 9/2016 |
| JP | 2016-216186 A | 12/2016 |
| JP | 2018-181763 A | 11/2018 |
| JP | 2019-102401 A | 6/2019 |
| KR | 10-2013-0015398 A | 2/2013 |
| KR | 10-1521543 B1 | 5/2015 |
| KR | 10-2016-0051347 A | 5/2016 |
| KR | 10-2020-0092658 A | 8/2020 |
| KR | 10-2020-0142744 A | 12/2020 |
| KR | 10-2021-007351 A | 6/2021 |
| WO | 2018/139349 A1 | 8/2018 |

OTHER PUBLICATIONS

International Search Report and Written Opinion dated Nov. 28, 2022, issued in corresponding International Patent Application No. PCT/KR2022/012528.

The extended European Search Report (EESR) dated Jun. 19, 2024, issued in corresponding EP Patent Application No. 22861666.0. (Note: JP 2015-130297 A was previously cited).

* cited by examiner

METHOD AND APPARATUS FOR MANUFACTURING UNIT CELLS

TECHNICAL FIELD

The present disclosure relates to a method and apparatus for manufacturing unit cells. Particularly, the present disclosure relates to a method and apparatus for manufacturing unit cells which provides improved cutting accuracy by forming a cutting guide line before cutting a separator sheet.

The present application claims priority to Korean Patent Application No. 10-2021-0111257 filed on Aug. 23, 2021 in the Republic of Korea, the disclosures of which are incorporated herein by reference.

BACKGROUND ART

As technological development of electric vehicles and mobile instruments and needs thereof have been increased, secondary batteries as energy sources have been increasingly in demand. Therefore, many studies have been conducted about batteries satisfying various needs.

Secondary batteries are classified, depending on the shape of a battery casing, into cylindrical batteries and prismatic batteries including an electrode assembly received in a cylindrical or prismatic metallic can, and pouch-type batteries including an electrode assembly received in a pouch-like casing made of an aluminum laminate sheet.

The electrode assembly received in a battery casing is a rechargeable power generation device having a stacked structure of positive electrode/separator/negative electrode. Such electrode assemblies are classified into jelly roll-type electrode assemblies formed by winding an active material-coated elongated sheet-like positive electrode and negative electrode with a separator interposed therebetween, and stacked electrode assemblies formed by stacking a plurality of positive electrodes and negative electrodes having a predetermined size with a separator interposed between both electrodes.

As an advanced electrode assembly which is a combination of the jelly roll-type electrode assembly with the stacked electrode assembly, there has been developed a stacked/folded electrode assembly having a structure obtained by folding a predetermined unit size of a full cell with a structure of positive electrode/separator/negative electrode or a bicell with a structure of positive electrode (negative electrode)/separator/negative electrode (positive electrode)/separator/positive electrode (negative electrode) by using a long continuous separator film.

There has been also developed a laminated/stacked electrode assembly having a structure formed by stacking unit cells in which electrodes and separators are stacked alternately and laminated in order to improve the processability of the existing stacked electrode assembly and to satisfy a need for various shapes of secondary batteries.

Particularly, to obtain a secondary battery by using a laminated/stacked electrode assembly, electrodes having a predetermined size are stacked on a separator sheet first, and then laminated and cut to form unit cells, followed by stacking.

However, in the case of a separator having a large width depending on cell design or a separator having high strength, there is a problem in that cutting defects are generated since cutting cannot be performed perfectly or cutting sections become irregular, thereby causing a decrease in yield of unit cells. Therefore, there is a need for controlling a process for manufacturing unit cells so that cutting defects may not be generated.

DISCLOSURE

Technical Problem

The present disclosure is designed to solve the problems of the related art, and therefore the present disclosure is directed to providing a method and apparatus for manufacturing unit cells which reduce cutting defects by increasing the cutting accuracy during the manufacture of the unit cells.

It will be easily understood that the objects and advantages of the present disclosure may be realized by the means shown in the appended claims and combinations thereof.

Technical Solution

The inventors of the present disclosure have found that the above-mentioned problem can be solved by the method and apparatus for manufacturing unit cells according to any one of the following embodiments.

According to the first embodiment of the present disclosure, there is provided a method for manufacturing unit cells, including the steps of:

A) preparing a pre-cell including a first separator sheet and a plurality of first electrodes disposed on the first separator sheet while being spaced apart from one another;

B) forming a cutting guide line including a plurality of though-holes spaced apart from one another on the pre-cell; and C) cutting the pre-cell along the cutting guide line to form a plurality of unit cells.

According to the second embodiment, there is provided the method for manufacturing unit cells as defined in the first embodiment, wherein the pre-cell further includes a second separator sheet and a second electrode.

According to the third embodiment, there is provided the method for manufacturing unit cells as defined in the first or the second embodiment, wherein step B) is a step of forming the cutting guide line in a region on the separator sheet corresponding to the region between the adjacent electrodes adjacent to each other among the electrodes disposed while being spaced apart from one another.

According to the fourth embodiment, there is provided the method for manufacturing unit cells as defined in any one of the first to the third embodiments, wherein step B) is a step of forming a plurality of through-holes along the width direction of the pre-cell.

According to the fifth embodiment, there is provided the method for manufacturing unit cells as defined in any one of the first to the fourth embodiments, wherein step B) is a step of forming the through-holes in such a manner that the through-holes may be formed with a relatively higher density at the central region of the pre-cell in the width direction, as compared to the other regions.

According to the sixth embodiment, there is provided the method for manufacturing unit cells as defined in any one of the first to the fifth embodiments, wherein step B) is a step of forming the through-holes in such a manner that the through-holes may be formed with a relatively higher density at the central region of the pre-cell and at both end regions of the pre-cell in the width direction, as compared to the other regions.

According to the seventh embodiment, there is provided the method for manufacturing unit cells as defined in any one of the first to the sixth embodiments, wherein step B) is a step of forming the through-holes in such a manner that the sum of the lengths of the through-holes extended along the width direction of the pre-cell may be 0.01-30% based on the total length of the pre-cell in the width direction.

According to the eighth embodiment, there is provided the method for manufacturing unit cells as defined in any one of the first to the seventh embodiments, wherein step B) is a step of forming the through-holes in such a manner that the length of the through-hole extended along the direction perpendicular to the width direction of the pre-cell may be 1-5% based on the interval of the adjacent electrodes.

According to the ninth embodiment, there is provided an apparatus for manufacturing unit cells, including:
- a hole-forming unit configured to form a cutting guide line including a plurality of though-holes spaced apart from one another, on a pre-cell including a separator sheet and electrodes disposed on the separator sheet; and
- a cutting unit configured to cut the pre-cell along the cutting guide line to form a plurality of unit cells.

According to the tenth embodiment, there is provided the apparatus for manufacturing unit cells as defined in the ninth embodiment, wherein the hole-forming unit includes a laser irradiation section.

According to the eleventh embodiment, there is provided the apparatus for manufacturing unit cells as defined in the ninth or the tenth embodiment, wherein the hole-forming unit is configured to form the through-holes in such a manner that the through-holes may be formed with a relatively higher density at the central region of the pre-cell in the width direction, as compared to the other regions.

According to the twelfth embodiment, there is provided the apparatus for manufacturing unit cells as defined in any one of the ninth to the eleventh embodiments, wherein the hole-forming unit is configured to form the through-holes in such a manner that the through-holes may be formed with a relatively higher density at the central region of the pre-cell and at both end regions of the pre-cell in the width direction, as compared to the other regions.

According to the thirteenth embodiment, there is provided the apparatus for manufacturing unit cells as defined in any one of the ninth to the twelfth embodiments, wherein the hole-forming unit is configured to form the through-holes in such a manner that the sum of the lengths of the through-holes extended along the width direction of the pre-cell may be 0.01-30% based on the total length of the pre-cell in the width direction.

According to the fourteenth embodiment, there is provided there is provided the apparatus for manufacturing unit cells as defined in any one of the ninth to the thirteenth embodiments, wherein the hole-forming unit is configured to form the through-holes in such a manner that the length of the through-hole extended along the direction perpendicular to the width direction of the pre-cell may be 1-5% based on the interval of the adjacent electrodes.

Advantageous Effects

The method and apparatus for manufacturing unit cells according to the present disclosure can increase cutting accuracy during the manufacture of unit cells by forming a cutting guide line, before carrying out cutting, and thus can reduce cutting defects and can improve the production yield of unit cells.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

BEST MODE

Figure 1:
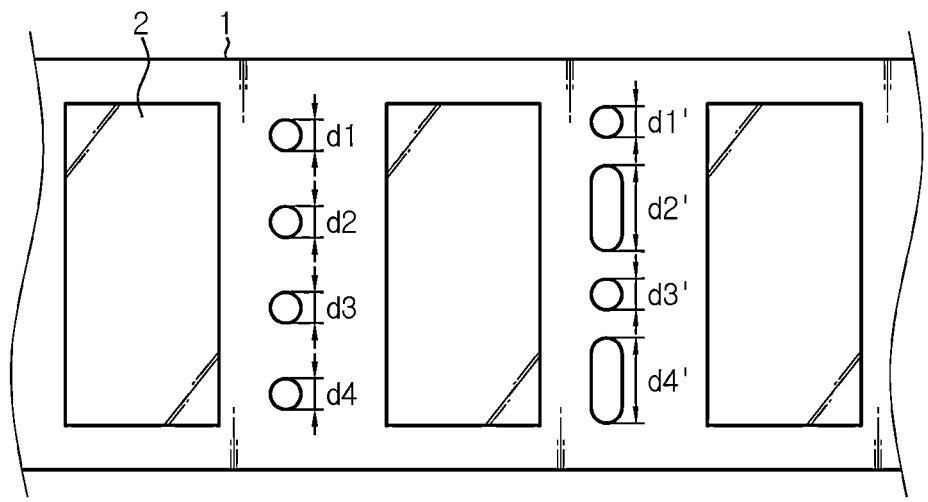
FIG. 1 is a schematic view illustrating the structure having a plurality of through-holes formed on a pre-cell according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Throughout the specification, the expression 'a part includes an element' does not preclude the presence of any additional elements but means that the part may further include the other elements.

As used herein, the expression 'A and/or B' means 'A, B or both of them'.

Method for Manufacturing Unit Cells

In one aspect of the present disclosure, there is provided a method for manufacturing unit cells, including the steps of:
- A) preparing a pre-cell including a first separator sheet and a plurality of first electrodes disposed on the first separator sheet while being spaced apart from one another;
- B) forming a cutting guide line including a plurality of though-holes spaced apart from one another on the pre-cell; and
- C) cutting the pre-cell along the cutting guide line to form a plurality of unit cells.

Hereinafter, each step of the method for manufacturing unit cells according to the present disclosure will be explained in detail.

First, A) prepared is a pre-cell including a first separator sheet and a plurality of first electrodes disposed on the first separator sheet while being spaced apart from one another.

The first separator sheet is an element which is disposed between a positive electrode and a negative electrode to prevent a short and to allow migration of ions, and includes a porous polymer substrate, and a porous coating layer disposed on at least one surface of the porous polymer substrate and formed of a mixture of inorganic particles with a binder polymer.

The porous polymer substrate, the inorganic particles and the binder polymer are not particularly limited, as long as they meet the objects of the present disclosure. For example, the porous polymer substrate may include a polyolefin resin, such as polyethylene, polypropylene, polybutylene or polypentene, having a melting point of less than 200° C. The inorganic particles may include $ZrO_2$, $BaTiO_3$, hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, AlOOH, $Al(OH)_3$, SiC, a mixture thereof, or the like. For example, the binder polymer may include any one selected from the group consisting of poly(vinylidene fluoride-co-hexafluoropropylene) (PVDF-HFP), poly(vinylidene fluoride-co-chlorotrifluoroethylene), poly(vinylidene fluoride-co-tetrafluoroethylene), poly(vinylidene fluoride-co-trichloroethylene), poly(methyl methacrylate), poly(vinyl pyrrolidone), poly(vinyl alcohol), poly(ethylene-co-vinyl acetate), cellulose acetate, cellulose acetate butyrate, cellulose acetate propionate, pullulan, carboxymethyl cellulose and styrene-butadiene rubber, or two or more of them.

In the porous coating layer, the inorganic particles are attached to one another by the binder polymer so that they may retain their binding states (i.e. the binder polymer interconnects and fixes the inorganic filler particles), and the porous coating layer is bound to the porous polymer substrate by the binder polymer. The inorganic filler particles in the porous coating layer are present substantially in contact with one another, and the interstitial volumes formed among the inorganic particles while they are in contact with one another may form pores of the porous coating layer.

The first electrode may be any one of the positive electrode and the negative electrode, and particularly, may be an electrode obtained by applying a slurry containing an electrode active material onto an electrode current collector, carrying out drying and pressing, and cutting the resultant product into a predetermined size.

According to the present disclosure, the first electrode is disposed on the first separator sheet, and particularly, a plurality of the first electrodes cut into a predetermined size are disposed on the first separator sheet in such a manner that the electrode may be spaced apart from one another by a predetermined interval. In this manner, a pre-cell may be obtained.

As used herein, 'pre-cell' means a laminate including at least one type of electrodes stacked on at least one separator sheet. In addition, the pre-cell may be subjected to lamination, after at least one type of electrodes are stacked on at least one separator sheet.

According to the present disclosure, the pre-cell including the first electrodes stacked on the first separator sheet may further include a second separator sheet and/or a second electrode. For example, the pre-cell may be a laminate having a layered structure, such as [first separator sheet/first electrode], [first separator sheet/first electrode/second separator sheet], or [first separator sheet/first electrode/second separator sheet/second electrode]. Herein, the first electrodes may be disposed on the first separator sheet, while being spaced apart from one another with a predetermined interval, and the second electrodes are those having the opposite polarity to the first electrodes and may be disposed on the second separator sheet with a predetermined interval.

According to the present disclosure, when lamination is carried out after at least one type of electrodes are stacked on at least one separator sheet, the separator sheet may be bound to the electrodes. For example, heat and/or pressure may be applied to the laminate in which at least one separator and at least one type of electrodes are stacked, by using a pair of pressurization rollers having a structure capable of self-heating or heated by a separate heating device so that the separator sheet may be bound to the electrodes. In other words, the pre-cell may be a laminate including at least one separator sheet and at least one type of electrodes bound to each other.

Next, B) a cutting guide line including a plurality of though-holes spaced apart from one another is formed on the pre-cell.

Step B) is configured to increase the cutting accuracy in step C) by forming a cutting guide line on the pre-cell, before the following step C) of cutting the pre-cell. The cutting guide line means an imaginary linear line by which a plurality of through-holes are connected.

The through-holes may be formed in a region on the separator sheet corresponding to the region between the adjacent electrodes adjacent to each other among the electrodes disposed while being spaced apart from one another. In addition, the through-holes may be formed along the width direction of the pre-cell. When the through-holes are formed in parallel with the width direction as mentioned above, it is possible to assist increasing the cutting accuracy in the following step C).

According to the present disclosure, the through-holes are those formed to penetrate through at least one separator sheet provided in the pre-cell. Although there is no particular limitation in the shape of the through-holes, the through-holes may be substantially circular through-holes having a substantially regular diameter, or substantially oval through-holes with a longer axis and a shorter axis having a different length.

Meanwhile, in the following step C) of cutting the pre-cell, cutting defects may be generated, and for example, a partial region of the pre-cell may not be cut or may show an irregular cutting section, in the case of a separator having an increased width depending on cell design or a separator having high strength, or due to the characteristics, such as a cutter shape, of the apparatus for manufacturing the separator.

Under these circumstances, according to an embodiment of the present disclosure, the position and density of the through-holes are controlled in forming the through-holes on the pre-cell, thereby facilitating cutting in the whole regions on the pre-cell and increasing the cutting accuracy.

Particularly, the density of the through-holes formed on the pre-cell may be controlled in such a manner that a region with frequent cutting defects may have a relatively higher density as compared to the other regions. For example, the through-holes may be formed in such a manner that the density of the through-holes may be relatively higher at the central region of the pre-cell in the width direction, as compared to the other regions, or the density of the through-holes may be relatively higher at the central region of the pre-cell and at both end regions of the pre-cell in the width direction, as compared to the other regions.

In addition, according to the present disclosure, the through-holes may be formed in such a manner that the sum of the lengths of the through-holes extended along the width direction of the pre-cell may be 0.01-30% based on the total length of the pre-cell in the width direction.

According to the present disclosure, 'sum of the lengths of the through-holes extended along the width direction of the pre-cell' means the sum of the lengths of the through-holes in the width direction of the pre-cell. For example, as shown in FIG. 1, 'sum of the lengths of the through-holes extended along the width direction of the pre-cell' means [d1+d2+d3+d4], or [d1'+d2'+d3'+d4'].

When the through-holes are formed within the above-defined range, it is possible to assist improving the cutting accuracy in the following step C), and to prevent generation of deformation, such as wrinkles or fine orientation, caused by concentration of the tension applied by a roll-to-roll system in the manufacturing process at the region having no through-holes on the separator sheet.

In addition, the through-holes may be formed in such a manner that the length of the through-hole extended along the direction perpendicular to the width direction of the pre-cell may be 1-5% based on the interval of the adjacent electrodes.

Figure 2:
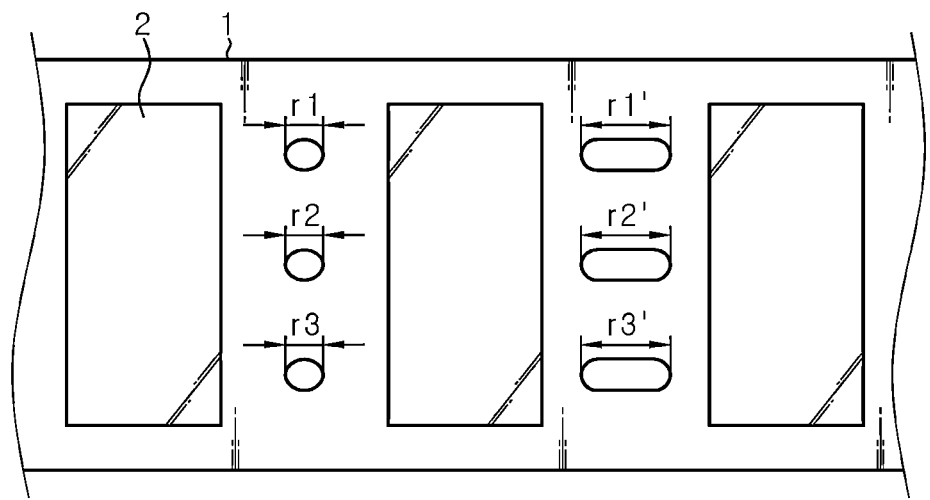
FIG. 2 is a schematic view illustrating the structure having a plurality of through-holes formed on a pre-cell according to another embodiment of the present disclosure.

According to the present disclosure, 'length of the through-hole extended along the direction perpendicular to the width direction of the pre-cell' means the length of the through-hole extended in the direction from one electrode to the electrode adjacent thereto. For example, as shown in FIG. 2, 'length of the through-hole extended along the direction perpendicular to the width direction of the pre-cell' means r1, r2, r3, r1', r2', or r3'.

When the through-holes are formed within the above-defined range, it is possible to provide uniform appearance to the section after cutting, while not affecting the electrode thermally during the formation of the through-holes.

Then, C) the pre-cell is cut along the cutting guide line to form a plurality of unit cells.

Particularly, the through-holes formed on the separator sheet while being spaced apart from one another determine the cutting guide line. Therefore, it is possible to obtain unit cells in which at least one separator sheet and at least one type of electrodes are stacked, such as unit cells having a layered structure of [first separator sheet/first electrode], [first separator sheet/first electrode/second separator sheet], or [first separator sheet/first electrode/second separator sheet/second electrode].

Apparatus for Manufacturing Unit Cells

In another aspect of the present disclosure, there is provided an apparatus for manufacturing unit cells, including:
- a hole-forming unit configured to form a cutting guide line including a plurality of though-holes spaced apart from one another, on a pre-cell including a separator sheet and electrodes disposed on the separator sheet; and
- a cutting unit configured to cut the pre-cell along the cutting guide line to form a plurality of unit cells.

Figure 3:
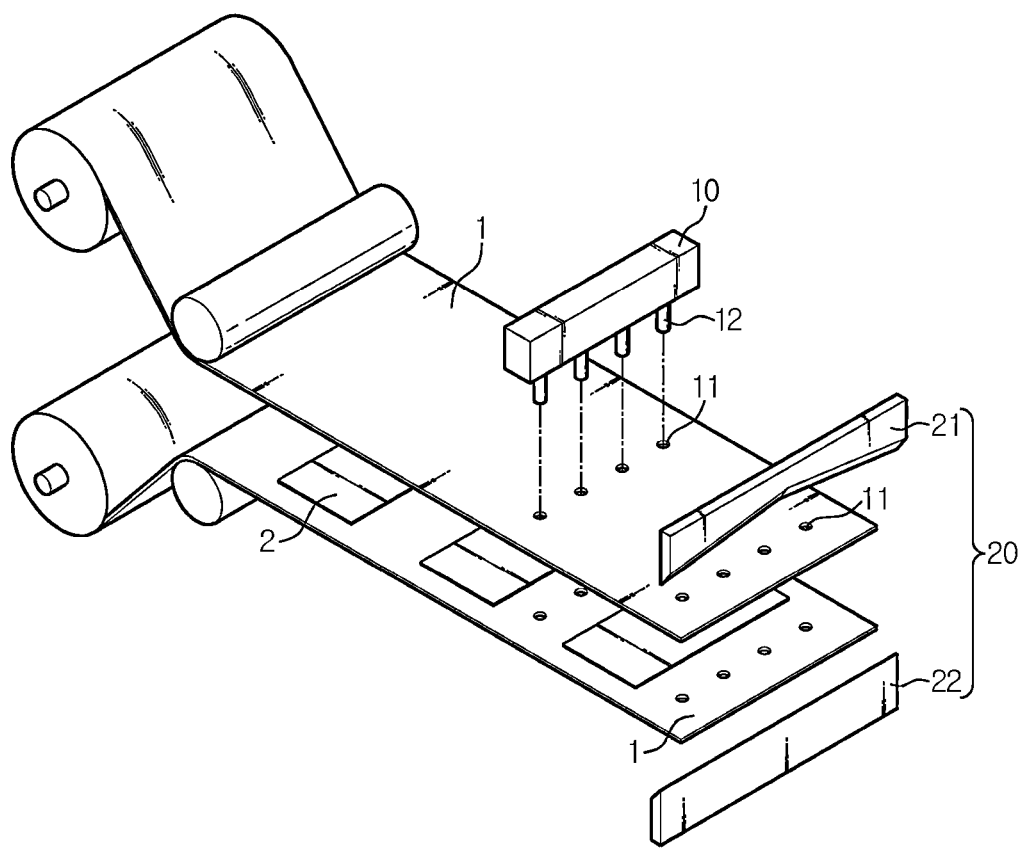
FIG. 3 is a schematic view illustrating an apparatus for manufacturing unit cells according to an embodiment of the present disclosure.

FIG. 3 is a schematic view illustrating the apparatus for manufacturing unit cells according to the present disclosure.

Referring to FIG. 3, the apparatus for manufacturing unit cells includes a hole-forming unit 10 and a cutting unit 20. The apparatus for manufacturing unit cells may further include a lamination unit (not shown) and/or a conveying unit (not shown) and/or a controlling unit (not shown), or the like, besides the above-mentioned constitutional elements.

The hole-forming unit 10 is configured to form a cutting guide line including a plurality of though-holes 11 spaced apart from one another, on a pre-cell including a separator sheet and electrodes 2 disposed on the separator sheet.

The hole-forming unit 10 may include at least one laser irradiation section 12. The laser irradiation section 12 irradiates laser beams in the direction substantially perpendicular to the pre-cell to form through-holes 11. Particularly, the hole-forming unit 10 forms a plurality of through-holes 11 in a region on the separator sheet corresponding to the region between the adjacent electrodes adjacent to each other among the electrodes disposed while being spaced apart from one another.

The cutting guide line means an imaginary linear line by which a plurality of through-holes are connected.

The hole-forming unit 10 may be provided with a plurality of laser irradiation sections 12 disposed in predetermined positions in such a manner that a plurality of through-holes 11 contained in one cutting line may be formed at the same time. The hole-forming unit 10 may be provided with at least one actuator (not shown), the motion of which is controlled by the user or by a controlling unit 50 to displace the position of at least one laser irradiation section 12. In this case, one cutting line may be formed by irradiating laser beams many times.

In addition, the hole-forming unit 10 may control the position and density of the through-holes 11 formed on the pre-cell by using a plurality of laser irradiation sections 12 disposed in pre-determined positions, or by using at least one laser irradiation section 12, the motion of which is controlled by the controlling unit 50 as described hereinafter. In this manner, it is possible to prevent generation of cutting defects, such as a failure in cutting in a partial region of the pre-cell or a non-uniform cutting section, thereby facilitating cutting in the whole regions on the pre-cell and increasing the cutting accuracy.

Particularly, the density of the through-holes 11 formed on the pre-cell may be controlled in such a manner that a region with frequent cutting defects may have a relatively higher density as compared to the other regions. For example, the through-holes 11 may be formed in such a manner that the density of the through-holes 11 may be relatively higher at the central region of the pre-cell in the width direction, as compared to the other regions, or the density of the through-holes 11 may be relatively higher at the central region of the pre-cell and at both end regions of the pre-cell in the width direction, as compared to the other regions.

In addition, according to the present disclosure, the through-holes 11 may be formed in such a manner that the sum of the lengths of the through-holes 11 extended along the width direction of the pre-cell may be 0.01-30% based on the total length of the pre-cell in the width direction. When the through-holes 11 are formed within the above-defined range, it is possible to assist improving the cutting accuracy in step C), and to prevent generation of deformation, such as wrinkles or fine orientation, caused by concentration of the tension applied by a roll-to-roll system in the manufacturing process at the region having no through-holes 11 on the separator sheet.

In addition, the through-holes 11 may be formed in such a manner that the length of the through-hole 11 extended along the direction perpendicular to the width direction of the pre-cell may be 1-5% based on the interval of the adjacent electrodes. When the through-holes 11 are formed within the above-defined range, it is possible to accomplish sharp cutting by providing uniform appearance to the section after cutting, while not affecting the electrode thermally during the formation of the through-holes 11.

The cutting unit 20 is configured to cut the pre-cell along the cutting guide line including a plurality of through-holes 11.

Particularly, the cutting unit 20 may include a blade cutter. As used herein, the blade cutter means a type of cutter including a top blade 21 and/or a bottom blade 22, wherein at least one of the top blade and the bottom blade cuts the substrate sheet, while moving vertically to the direction of conveying the substrate sheet. Herein, the terms 'top blade' and 'bottom blade' are not limited to those disposed at the top and bottom in the direction of gravity, but may cover cutters each of which is present in one direction and the opposite direction.

To obtain a unit cell including a separator having a large width, such as a unit cell of a pouch-type battery for electric vehicles (EV), atop blade having a substantially reverse-V (^) shape may be used when cutting the pre-cell. In this case, the blade insertion length is short to minimize the motion and to reduce the cutting time. However, in this case, the central region in the width direction of the pre-cell may cause cutting defects more easily as compared to the other regions due to the shape of the blade cutter. Therefore, according to an embodiment of the present disclosure, a plurality of through-holes 11 is formed in a region with frequent cutting defects, and the density of the through-holes 11 is controlled to facilitate cutting in the whole regions on the pre-cell and to increase the cutting accuracy.

The lamination unit (not shown) may include a pair of pressurization rollers. The lamination unit may pressurize a laminate in which at least one separator sheet 1 and at least one type of electrodes 2 are stacked so that they may be bound to each other. In this case, the pressurization rollers may further apply heat in addition to pressure. To apply heat and pressure at the same time as mentioned above, the pressurization rollers may have a structure capable of self-heating or may be heated by a separate heating device.

Particularly, according to the present disclosure, before forming the cutting guide line including a plurality of through-holes 11 disposed on the pre-cell while being spaced apart from one another, the pre-cell may be passed through a lamination unit 30 so that the separator sheet 1 and the electrode 2 disposed on the separator sheet 1 may be bound to each other.

The conveying unit (not shown) may be provided to convey the pre-cell including the separator sheet 1 and the electrodes 2 disposed on the separator sheet 1 in one direction in the apparatus for manufacturing unit cells. Particularly, the conveying unit may include a conveyer. For example, the conveying unit may include a belt conveyor.

The controlling unit may be positioned inside and/or outside of the apparatus for manufacturing unit cells according to the present disclosure, and linked to each of the units described hereinabove to control the operation of each unit and the operational interrelation of the units.

For example, the controlling unit may control the operation of an electrode-arranging unit (not shown) through control signals to dispose the electrodes 2 at a regular interval on the separator sheet. In addition, the controlling unit may control the operation of the hole-forming unit 10 through control signals to form a plurality of through-holes 11 in each region between the electrodes spaced apart from each other, and may control the position and density of the through-holes 11 formed on the pre-cell.

EXAMPLES

Example 1 and Comparative Example 1 were prepared according to the following methods.

Example 1

1) Step of Preparing Pre-Cell

Prepared were two separator sheets including a polyethylene porous film (thickness 9 µm, porosity 45%) coated with $Al_2O_3$ layers on both surfaces thereof.

A pre-cell was prepared by disposing negative electrodes cut into a size of 94 mm×510 mm on each separator sheet so that the separator sheet, the negative electrode and the separator sheet might be stacked in the listed order with the two separator sheets as substrates. Herein, the negative electrode cut into such a size was disposed between the separator sheets.

2) Step of Forming Cutting Guide Line

The apparatus for manufacturing unit cells according to the present disclosure was used to form a cutting guide line including through-holes on the pre-cell prepared as described above. Herein, the through-holes were formed in a straight line along the width direction of the pre-cell in a circular shape having a diameter of 50 µm.

The sum of the lengths of the through-holes extended along the width direction of the pre-cell was 0.48% based on the total length in the width direction of the pre-cell. In addition, the length of the through-hole extended along the direction perpendicular to the width direction of the pre-cell was 1.6% [(50 µm/3 mm)×100%=about 1.6%] based on the interval between the adjacent electrodes.

3) Manufacture of Unit Cells

The pre-cell was cut by using a blade having a reverse-V shape along the cutting guide line to obtain a plurality of unit cells.

Comparative Example 1

Unit cells were obtained in the same manner as Example 1, except that no cutting guide line was formed.

Evaluation Results

Figure 4:
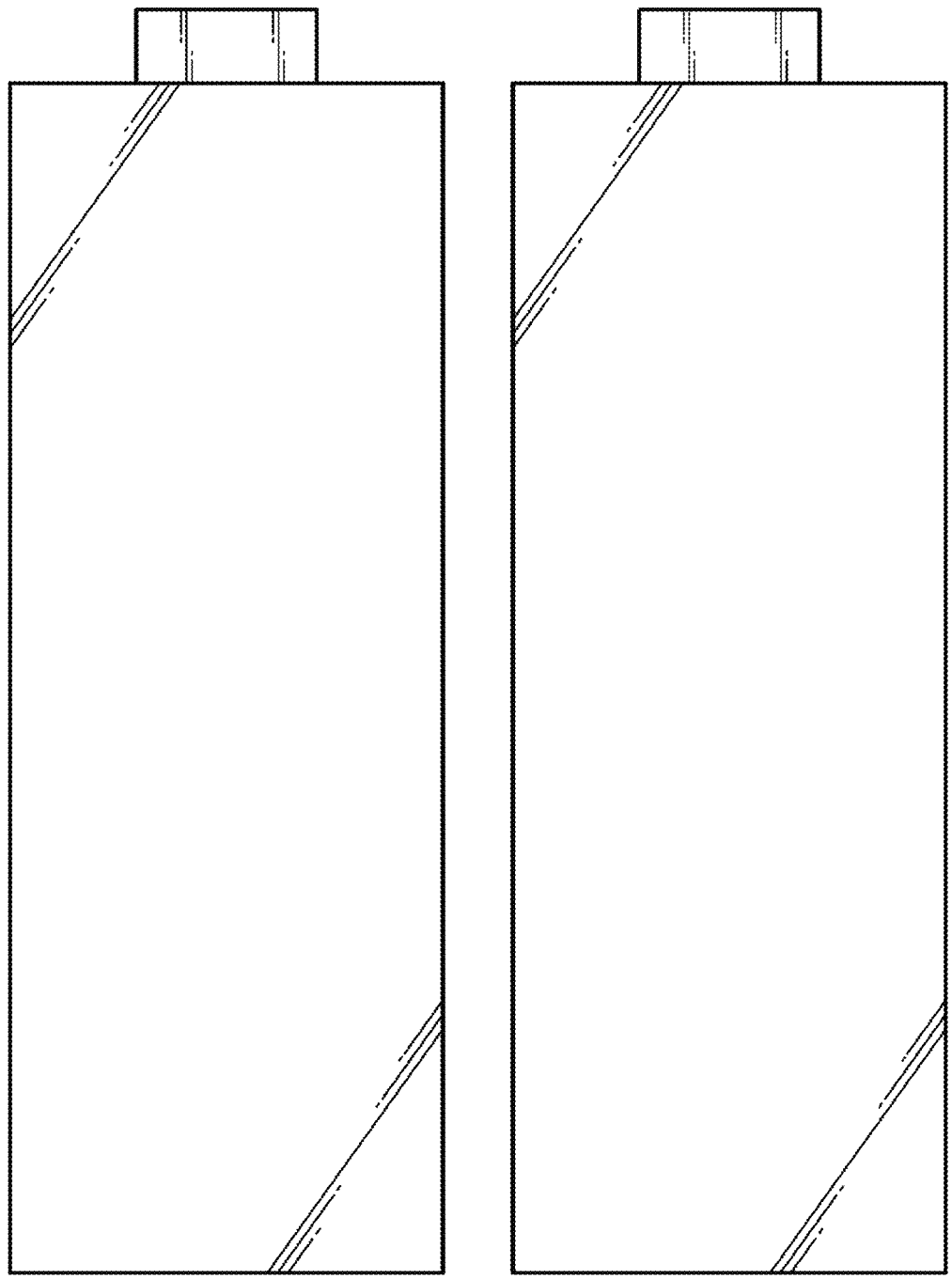
FIG. 4 shows unit cells cut according to Example 1 of the present disclosure.
Figure 5:
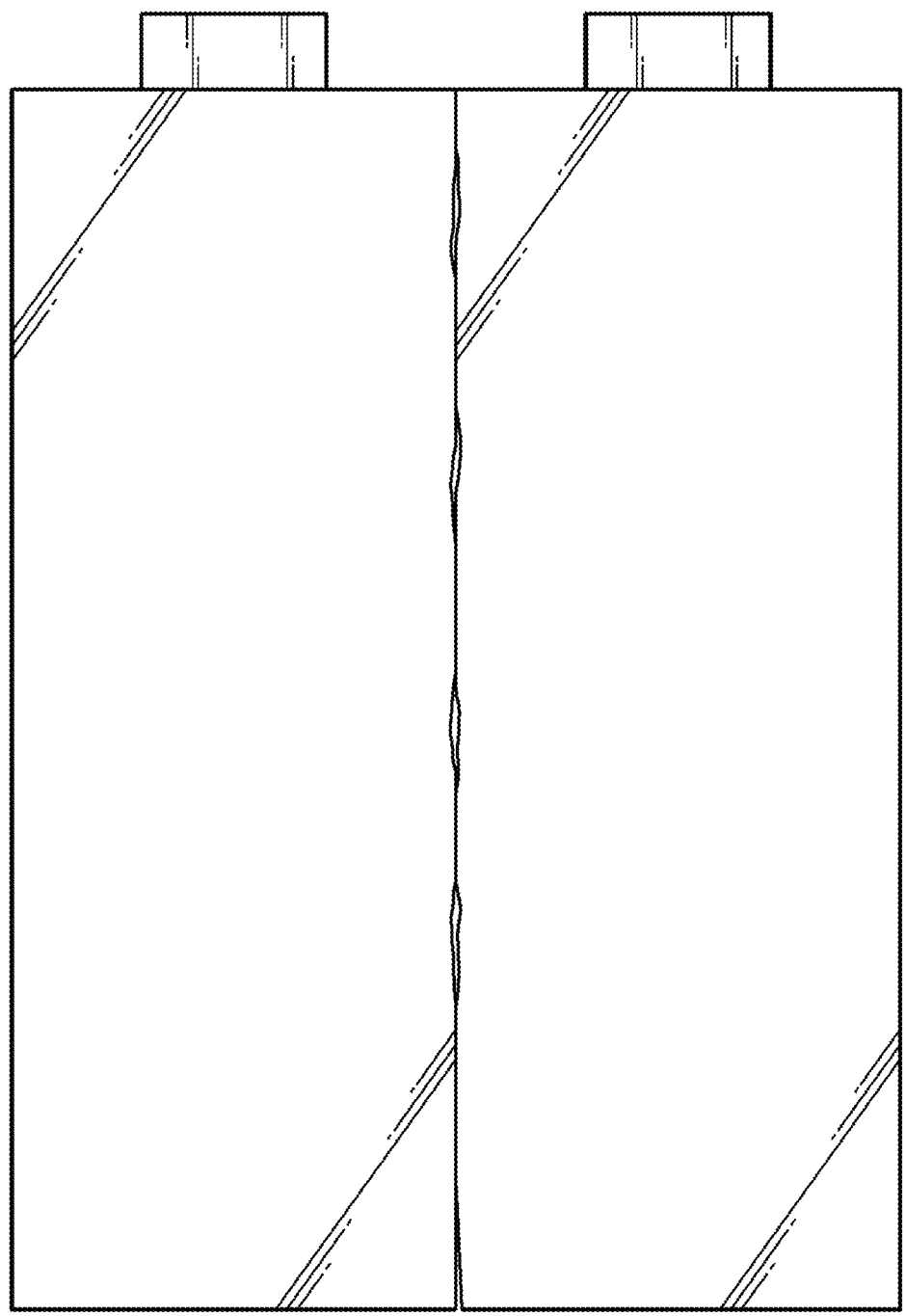
FIG. 5 shows unit cells cut according to Comparative Example 1.

It was determined whether cutting defects were generated or not in the unit cells according to Example 1 and the unit cells according to Comparative Example 1. The unit cell according to Example 1 and the unit cell according to Comparative Example 1 are shown in FIG. 4 and FIG. 5, respectively. It can be seen that Example 1 shows a more uniform cutting section of each unit cell and accomplishes sharper cutting, as compared to Comparative Example 1.

DESCRIPTION OF DRAWING NUMERALS

1: Separator sheet
2: Electrode
10: Hole-forming unit
11: Through-hole
12: Laser irradiation section
20: Cutting unit
21: Top blade
22: Bottom blade

What is claimed is:

1. A method for manufacturing unit cells, comprising:
   preparing a pre-cell comprising a first separator sheet and a plurality of first electrodes disposed on the first separator sheet while being spaced apart from one another;
   forming a cutting guide line comprising a plurality of though-holes spaced apart from one another on the pre-cell; and
   cutting the pre-cell along the cutting guide line to form a plurality of unit cells.

2. The method for manufacturing unit cells according to claim 1, wherein the pre-cell further comprises a second separator sheet and a second electrode.

3. The method for manufacturing unit cells according to claim 1, wherein the forming a cutting guide line includes forming the cutting guide line in a region on the separator sheet corresponding to the region between the adjacent electrodes adjacent to each other among the electrodes disposed while being spaced apart from one another.

4. The method for manufacturing unit cells according to claim 1, wherein the forming a cutting guide line includes forming a plurality of through-holes along the width direction of the pre-cell.

5. The method for manufacturing unit cells according to claim 1, wherein the forming a cutting guide line includes forming the through-holes in such a manner that the through-holes may be formed with a relatively higher density at the central region of the pre-cell in the width direction, as compared to the other regions.

6. The method for manufacturing unit cells according to claim 1, wherein the forming a cutting guide line includes forming the through-holes in such a manner that the through-holes may be formed with a relatively higher density at the central region of the pre-cell and at both end regions of the pre-cell in the width direction, as compared to the other regions.

7. The method for manufacturing unit cells according to claim 1, wherein the forming a cutting guide line includes forming the through-holes in such a manner that the sum of the lengths of the through-holes extended along the width direction of the pre-cell may be 0.01-30% based on the total length of the pre-cell in the width direction.

8. The method for manufacturing unit cells according to claim 1, wherein the forming a cutting guide line includes forming the through-holes in such a manner that the length of the through-hole extended along the direction perpendicular to the width direction of the pre-cell may be 1-5% based on the interval of the adjacent electrodes.

9. An apparatus for manufacturing unit cells, comprising:
a hole-forming unit configured to form a cutting guide line on a pre-cell including a separator sheet and electrodes disposed on the separator sheet, the cutting guide line comprising a plurality of though-holes spaced apart from one another; and
a cutting unit configured to cut the pre-cell along the cutting guide line to form a plurality of unit cells.

10. The apparatus for manufacturing unit cells according to claim 9, wherein the hole-forming unit comprises a laser irradiation section.

11. The apparatus for manufacturing unit cells according to claim 9, wherein the hole-forming unit is configured to form the through-holes in such a manner that the through-holes may be formed with a relatively higher density at the central region of the pre-cell in the width direction, as compared to the other regions.

12. The apparatus for manufacturing unit cells according to claim 9, wherein the hole-forming unit is configured to form the through-holes in such a manner that the through-holes may be formed with a relatively higher density at the central region of the pre-cell and at both end regions of the pre-cell in the width direction, as compared to the other regions.

13. The apparatus for manufacturing unit cells according to claim 9, wherein the hole-forming unit is configured to form the through-holes in such a manner that the sum of the lengths of the through-holes extended along the width direction of the pre-cell may be 0.01-30% based on the total length of the pre-cell in the width direction.

14. The apparatus for manufacturing unit cells according to claim 9, wherein the hole-forming unit is configured to form the through-holes in such a manner that the length of the through-hole extended along the direction perpendicular to the width direction of the pre-cell may be 1-5% based on the interval of the adjacent electrodes.

* * * * *